Sept. 12, 1933.　　　　F. W. PETERS　　　　1,926,858
FLEXIBLE CONNECTION
Filed Nov. 6, 1929　　　　2 Sheets-Sheet 1
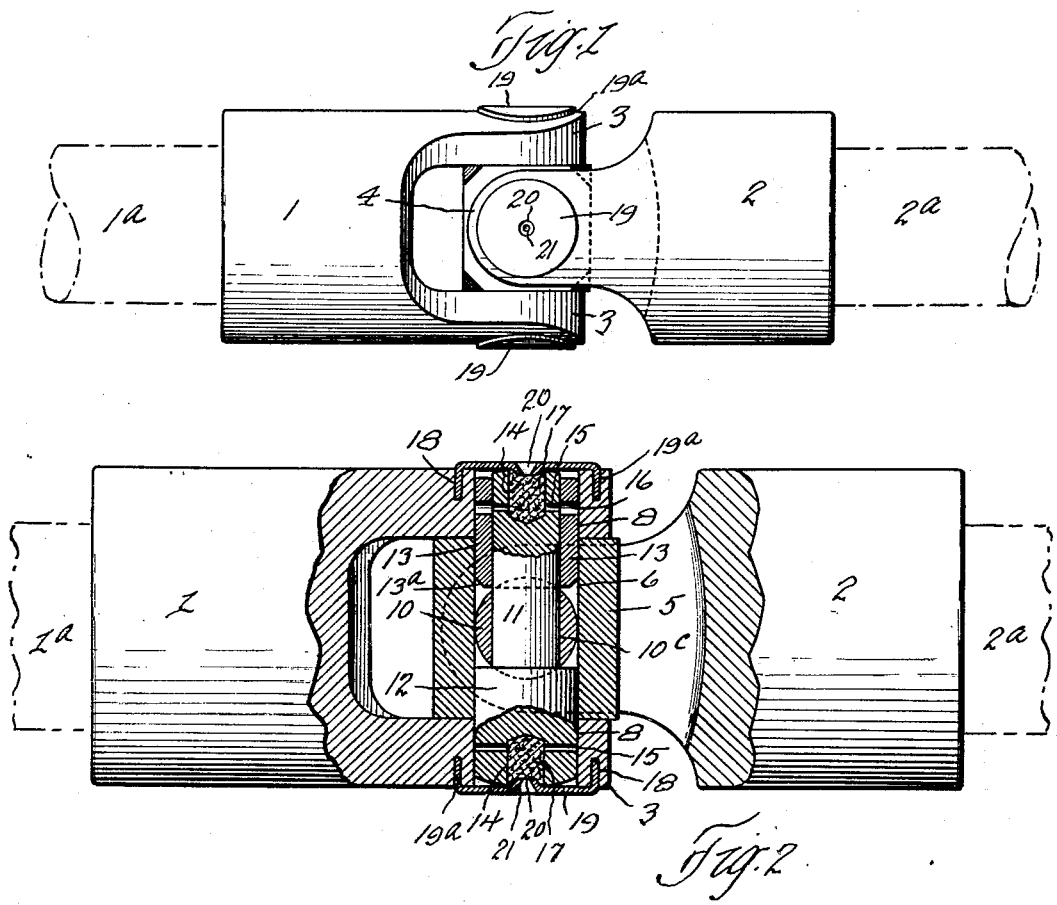
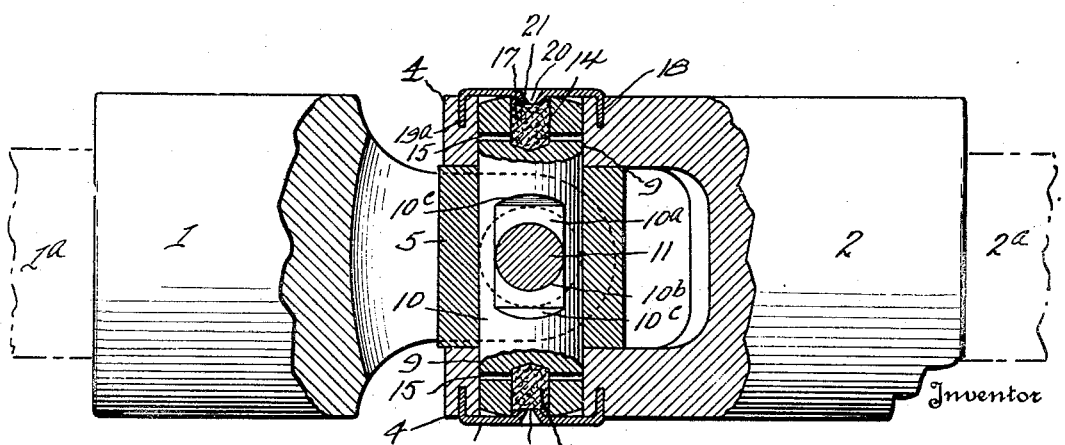

Sept. 12, 1933.    F. W. PETERS    1,926,858
FLEXIBLE CONNECTION
Filed Nov. 6, 1929    2 Sheets-Sheet 2
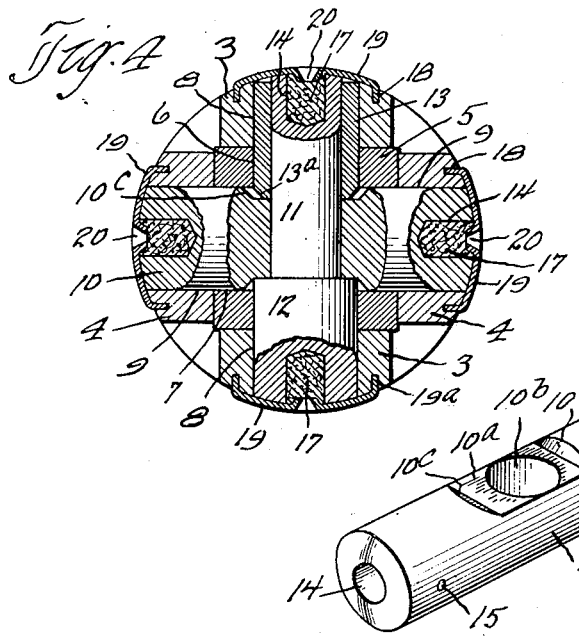
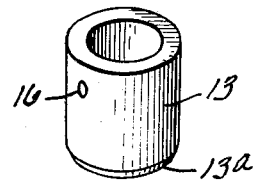
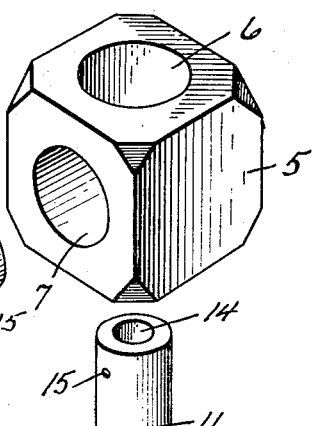
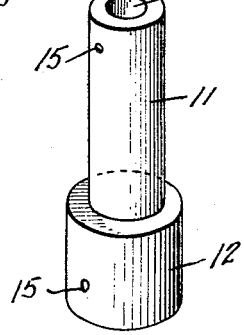
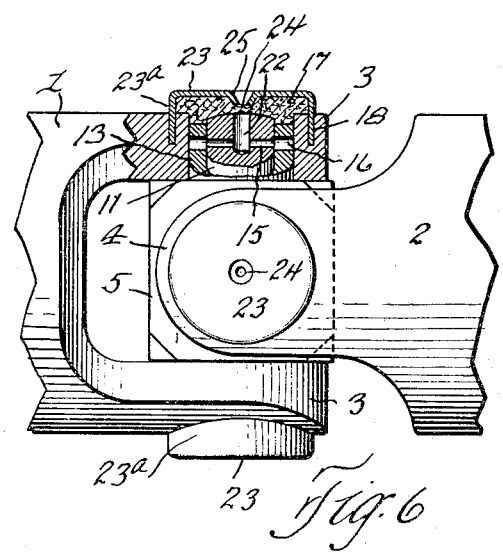
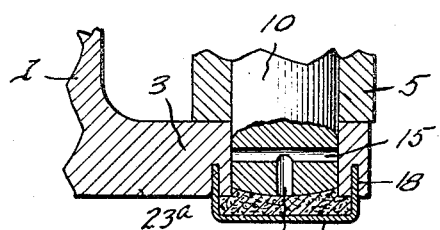
Inventor
Frederick W. Peters
By Hull, Brock & West
Attorneys Patented Sept. 12, 1933

1,926,858

UNITED STATES PATENT OFFICE 1,926,858

FLEXIBLE CONNECTION

Frederick W. Peters, Cleveland, Ohio, assignor to The Almetal Universal Joint Company, Cleveland, Ohio, a corporation of Ohio Application November 6, 1929. Serial No. 405,076

7 Claims. (Cl. 64—102)

This invention relates to flexible connections, and more particularly to connections of the universal joint type, and has for its general object to provide a connection or joint of this character which is extremely simple of construction and economical of production, and which will withstand for a long period of time the ordinary incidents of use.

The joint or connection shown herein is of a type which is known to the trade as the "Boston Gear" joint, this type of joint comprising a pair of cross pins extending through a central block, with the ends of the pins mounted in bearings provided in yoke arms which project from the hubs which are secured to the driving and driven shaft members. The cross pins of the joints referred to are of unequal diameter and the pin of greater diameter is transversely bored for the reception of the other and smaller pin. This results in the bearings for the smaller pin being of smaller area than those for the ends of the larger pins and are incapable of withstanding wear for as long a period of time as the larger bearings.

One of the more limited objects of my invention is to provide a construction wherein the smaller pin will be provided, in a simple and economical manner, with bearings of the same size or area as those for the larger pin.

A still further object of the invention is to provide for joints of this type a simple, economical and effective means for lubricating the bearings.

I accomplish the objects referred to hereinbefore, in and through the construction and arrangement of parts shown in the drawings, wherein—

Fig. 1 represents a side elevation of a joint embodying my invention;

Fig. 2, an enlarged sectional elevation of the joint shown in Fig. 1;

Fig. 3, a view similar to Fig. 2, but taken at right angles thereto;

Fig. 4, a sectional view taken through the central part of the joint and transversely thereof, certain parts being shown in elevation;

Fig. 5, a perspective view of the central connecting block pins and bushing;

Fig. 6, a side elevation of a modification of the joint shown in the preceding views, one end of the smaller pin and the cooperating parts being shown in section; and Fig. 7, a detail in section of one of the other pin ends and of the parts cooperating therewith.

Describing the parts by reference characters and referring first to the form of my invention shown in Figs 1 to 5, inclusive, 1 and 2 denote the hubs or sleeves which are attached to the shaft sections $1^a$ and $2^a$, respectively, to be coupled, the hub 1 being provided with the yoke arms 3 and the hub 2 being provided with the yoke arms 4. These hubs are connected by means of a centrally arranged connecting block 5 having bores 6 and 7 extending therethrough at right angles to each other and intersecting at the center of the block. The block is of such dimensions as to be received within the inner faces of the yoke arms 3 and 4 and preferably to contact, or substantially contact, with the inner faces of such arms. The bores 6 and 7 are preferably of the same diameter as well as of the same diameter as the bores 8 and 9 provided in the ends of the yoke arms 3 and 4, respectively.

10 denotes a pin which is of the same diameter throughout its length as the bore 7, with the exception of the central portion, which is provided with diametrically opposed recesses $10^a$, for a purpose to be explained hereinafter. When the yoke arms are assembled in the positions shown and the block 5 inserted therebetween, the pin 10 is inserted in place, its ends forming trunnions within the bores 9.

The other pin comprises a reduced body 11 and an end 12 which is of the same diameter as the bore 6 and the pin 10 and which end forms a trunnion in the bore 8 of one of the yoke arms 3. The reduced body 11 extends through a central bore $10^b$ in the pin 10, which central bore intersects the recess $10^a$. The opposite end of the pin 11 is received within and forms a driving fit with the interior of a bushing 13 which is received within the bore 8 of the opposite yoke arm 3 and which bushing extends into the bore 6 of the block 5, the inner end of the bushing substantially contacting with the bottom of the adjacent recess $10^a$. The smaller end of the pin 11, when thus equipped with the bushing 13, provides a trunnion of the same size as the opposite enlarged end 12 of said pin.

It will be noted that the inner end of the bushing 13 is beveled, as shown at $13^a$; also that the opposite ends $10^c$ of each recess $10^a$ are beveled; also that the outer end of the bushing 13, when in place, extends as far as that portion of the outer surface of the yoke arm 3 in which it is mounted which is nearest to the center of the connecting block—it being noted that the outer surface of each yoke arm 3 is in the form of a segment of a cylinder.

In the forms of my invention shown in Figs. 1 to 5, inclusive, the outer ends of each of the cross pins are provided each with a chambered bore 14 extending inwardly from the outer end thereof and with ports 15 extending from the inner end of such chambered bore through each pin end. In the case of the reduced end of the pin 11, ports 16 are provided in the bushing 13, the said ports registering with the ports 15. Each chamber 14 is filled with absorbent material 17 which is saturated with oil or other suitable lubricant, the lubricant being delivered through the ports 15 to the bores surrounding the pin ends and the bushing 13.

In order to retain the lubricant in place and to exclude dust from the journals and at the same time reduce to a minimum the loss of the lubricant through centrifugal action, the following construction is provided:

Each yoke arm is provided with an annular groove 18 surrounding the bores 8 and 9, respectively. Into this groove there is sprung the cylindrical side wall 19ª of a cap, the top of which is indicated at 19. The cap is provided with a small central aperture 20 which may be formed by punching the metal of the cap inwardly, thereby to provide a small opening for renewing the supply of lubricant to the absorbent material 14. The manner of forming this opening provides an inwardly extending frusto-conical projection 21 at the center of the cup, and this construction reduces to a minimum the loss of lubricant due to centrifugal action.

Reference has been made hereinbefore to the provision of the inclined surfaces 10ᶜ at the ends of the recesses 10ª and to the provision of the frusto-conical or beveled surface 13ª at the inner end of the bushing 13. This construction facilitates the disassembling of the joint. Assuming that such a disassembling operation is desirable or necessary, the cap 19 which surrounds the reduced end of the pin 11 is removed and the pin is then driven out of the yoke arms and the block 5, leaving the bushing 13 in place. Then, by removing one of the caps 19 which surround the ends of the larger pin 10, this pin may be driven out, the bushing 13 being moved out of the way by the engagement of the appropriate inclined face 10ᶜ with the inclined end of the bushing.

By virtue of the construction described, I am enabled to produce a joint which is extremely inexpensive of production, which provides for efficient and convenient lubrication of the bearings, and which enables the use of a connecting block with cross pins, the ends of which constitute trunnions while retaining the maximum bearing surface for both ends. Furthermore, the construction referred to enables the joint to be quickly and conveniently assembled and disassembled.

In Figs. 6 and 7 there is shown the same form of joint as illustrated in the preceding view, but with a somewhat different construction for lubricating the trunnion bearings. Each arm 3 and 4 is provided with an annular groove 18 as before. The ends of the pins in this case are not chambered, but each is provided with a smaller central bore 22 extending inwardly from the outer end thereof and communicating at its inner end with ports 15. In the case of the pin having the reduced end, the outer ends of the ports 15 communicate as before with ports 16 in the bushing 13. The caps 23, 23ª are similar to the caps 19, 19ª, but the flanges are of considerably greater depth than are the flanges of the first-mentioned cap. This provides a chamber arranged externally of the outer end of each pin and (in the case of the pin 11) externally of the outer end of the bushing 13, and the absorbent material 17 in this case fills this chamber. The caps, as before, are provided each with a central aperture 24 surrounded by a frusto-conical projection 25.

Having thus described my invention, what I claim is:

1. A universal joint comprising, in combination, a pair of members each having a pair of yoke arms, the said arms being provided each with a bore extending therethrough for the reception of an end of a trunnion pin, the bores in each arm being of the same diameter, a block interposed between said arms and having intersecting bores therethrough adapted to register with the bores in the yoke arms, a trunnion pin extending through one of the bores of said block and having its ends journaled in the bores of one of said pairs of yoke arms and having a central bore therethrough of smaller diameter than the bores in the yoke arms and a recess surrounding one end of the bore of said pin and having an inclined surface spaced from the said bore in the direction of the length of said pin, a trunnion pin extending through the bore of the first-mentioned pin and through the other bore in said block, one end of the second pin having a diameter whereby it may be journaled directly in one of the bores of one of the arms of the other yoke, the body of the pin and the opposite end thereof being of smaller diameter than the first mentioned end of said pin; and a bushing fitted on the reduced end of the second pin and mounted in the other bore of the second yoke, the inner end of the bushing extending into the recess of the first pin and having a beveled surface adapted to be engaged by the said inclined surface when the second pin is removed from the bore of the first pin thereby to move the bushing outwardly by appropriate longitudinal movement of the first pin in the bores by which its ends are supported.

2. A universal joint comprising, in combination, a pair of members each having a pair of yoke arms, the said arms being provided each with a bore extending therethrough for the reception of an end of a trunnion pin, the bores in each arm being of the same diameter, a block interposed between said arms and having intersecting bores therethrough adapted to register with the bores in the yoke arms, a trunnion pin extending through one of the bores of said block and having its ends journaled in the bores of one of said pairs of yoke arms and having a central bore therethrough of smaller diameter than the bores in the yoke arms and having opposed recesses therein each surrounding an end of the bore through said pin, the ends of said recesses being formed by inclined surfaces extending outwardly from such recesses and spaced from the bore of said pin in the direction of the length of the latter, a trunnion pin extending through the bore of the first-mentioned pin and through the other bore in said block, one end of the second pin having a diameter whereby it may be journaled directly in one of the bores of one of the arms of the other yoke, the body of the pin and the opposite end thereof being of smaller diameter than the first mentioned end of said pin; and a bushing fitted on the reduced end of the second pin and mounted in the other bore of the second yoke, the inner end of the bushing extending into the adjacent recess of the first pin and having its inner end beveled and adapted to be engaged by either of the said inclined surfaces when the second pin is removed from the bore of the first pin according as the first-mentioned pin is moved longitudinally in either direction along the bores by which its ends are supported.

3. A universal joint comprising, in combination, a pair of members each having a pair of yoke arms, the said arms being provided each with a bore for the reception of a trunnion pin, a block interposed between said arms and having intersecting bores therethrough, the ends of the bores being arranged to register with the bores in the yoke arms, a pin extending through one of the bores in said block and having its ends journaled in the bores in one of said yoke arms, a second pin extending through the other bore of said block and having its ends journaled in the bores of the other yoke arm, each yoke arm having a groove in the exterior thereof surrounding the bore therethrough, a cap having a side wall seated within each such groove, and lubricant-containing material within each cap, each pin having a bore in its outer end for receiving lubricant from the space enclosed by the cooperating cap and also having a transverse bore for conducting the lubricant to the bearing for such pin provided by the bore therefor.

4. A universal joint comprising, in combination, a pair of members each having a pair of yoke arms, the said arms being provided each with a bore for the reception of a trunnion, a connecting member interposed between said arms and having trunnions journaled in said bores, each yoke arm having a groove in the exterior thereof surrounding the bore therethrough, a cap having a side wall seated within each such groove, and lubricant-containing material within each cap, each trunnion having a bore in its outer end for receiving lubricant from the space enclosed by the cooperating cap and also having a transverse bore for conducting the lubricant to the bearing for such trunnion.

5. A universal joint comprising, in combination, a pair of members each having a pair of yoke arms, the said arms being provided each with a bore for the reception of a trunnion and each arm having a circular groove in the exterior thereof surrounding the bore therethrough, a connecting member between said yoke arms and provided with trunnions mounted in the bores thereof, each trunnion having a chambered bore projecting thereinto from the outer end thereof and also having a transverse bore extending from such chambered bore to the trunnion bearing, lubricant-containing material within said chambered bore, and a cap for each of said grooves, each cap having a cylindrical side wall sprung into the groove with which it cooperates.

6. A universal joint comprising, in combination, a pair of members each having a pair of yoke arms, the said arms being provided each with a bore for the reception of a trunnion and each arm having a circular groove in the exterior thereof surrounding the bore therethrough, a connecting member between said yoke arms and provided with trunnions mounted in the bores thereof, each trunnion having a chambered bore projecting thereinto from the outer end thereof and also having a transverse bore extending from such chambered bore to the trunnion bearing, lubricant-containing material within said chambered bore, and a cap for each of said grooves, each cap having a cylindrical side wall sprung into the groove with which it cooperates and each cap having its central portion projected inwardly and provided at the end of the projection with a small aperture for supplying lubricant to the material within the chambered bore.

7. A universal joint comprising, in combination, a pair of members each having a pair of yoke arms, the said arms being provided each with a bore for the reception of a trunnion, a block interposed between said arms and having trunnions mounted in the bores thereof, one of said trunnions consisting of a pin and a bushing surrounding the same and secured thereto, the yoke arm in which such bushing is mounted having a groove in the outer face thereof surrounding the bore therethrough, a cap having a wall seated in such groove, the said trunnion pin having a chambered bore extending inwardly from the outer end thereof and a port communicating at its inner end with the chambered bore and extending through the wall of said pin, and the said bushing having a port extending through the wall thereof and adapted to register at its inner end with the outer end of the first-mentioned port, and lubricant-containing material in the chambered bore, the said cap having a small opening surrounded by an inwardly frusto-conical wall for supplying lubricant to the material within such chambered bore.

FREDERICK W. PETERS.